Dec. 23, 1941.    H. ALFARO    2,267,437
SUPERCHARGER FOR AIRCRAFT ENGINES
Filed Dec. 16, 1939    3 Sheets-Sheet 1

INVENTOR
HERACLIO ALFARO
BY *Evans & McCoy*
ATTORNEYS

Dec. 23, 1941.  H. ALFARO  2,267,437
SUPERCHARGER FOR AIRCRAFT ENGINES
Filed Dec. 16, 1939  3 Sheets-Sheet 2

INVENTOR
HERACLIO ALFARO
BY Evans & McCoy
ATTORNEYS

Patented Dec. 23, 1941

2,267,437

UNITED STATES PATENT OFFICE 2,267,437

SUPERCHARGER FOR AIRCRAFT ENGINES

Heraclio Alfaro, Boston, Mass.

Application December 16, 1939, Serial No. 309,509

29 Claims. (Cl. 123—51)

This invention relates to internal combustion engines of the two-stroke cycle type, and more particularly to means for improving the performance of supercharged two-stroke cycle engines used in connection with aircraft.

The power of an internal combustion engine depends upon the weight of air it consumes per unit of time. If the weight of the air is lower per unit of volume than at sea level the power of a conventional internal combustion engine drops in proportion to the drop in atmospheric pressure at high altitudes. To avoid this disadvantage, many engines are equipped with superchargers or means to compress the air previous to reaching the cylinders. It is difficult to supercharge engines of the two-stroke cycle type because of the fact that the air is admitted to the cylinder when both the inlet and the exhaust ports are open. Since the exhaust is directly connected to the atmosphere it is difficult to charge the cylinder with air at a pressure higher than that of the surrounding atmosphere.

The present invention has for its object to increase the power attainable by a two-stroke cycle aircraft engine at high altitudes.

In my invention I take advantage of the change of atmospheric pressure with altitude to automatically control the supercharging of two-stroke cycle engines so as to obtain satisfactory supercharging at altitudes much above sea level.

A further object of the invention is to maintain substantially constant power at varying altitudes above sea level.

A further object of the invention is to provide means for regulating the fuel feed in such a way as to maintain the proper fuel-air ratio above a predetermined altitude.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which.

Figures 12, 13:
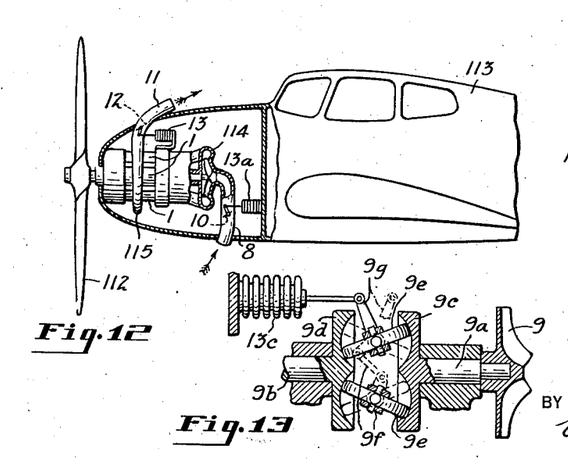
Fig. 12 shows the controlling device of the present invention applied to the engine of an aeroplane.
Fig. 13 is a sectional view of the change speed driving means for the air pump.

In the accompanying drawings, the cylinder 1 of a two-cycle double opposed piston internal combustion engine is shown, the cylinder 1 being provided with inlet ports 2 and exhaust ports 3, opposed pistons 4 and 5 being mounted in the cylinder and movable from a position in which the opposed faces of the pistons are in close proximity midway between the ends of the cylinder to the positions shown in the drawings in which the pistons 4 and 5 have moved outwardly past the inlet and exhaust ports 2 and 3 to open the same. The reciprocating motion of the pistons 4 and 5 may be effected by any suitable means such as connecting rods, swash plates, end cams, or other means well known in the art. The engine may be of the compression-ignition type or of the spark ignition type. If of the spark ignition type, suitable spark plugs 6 may be provided for igniting the charge. Fuel may be mixed with the air fed to a cylinder through the inlet ports 2, or it may be directly injected into the cylinder. As herein shown, fuel is delivered into the central portion of the cylinder through an injector nozzle 7. Air is delivered into the cylinder through a pipe 8 by means of pump 9. The pipe 8 may be throttled by means of a valve 10 as shown in Figs. 2, 3, 5, and 6. The exhaust ports 3 communicate with a pipe 11 which may be throttled by means of a valve 12. In multicylinder engines the inlet pipe 8 and exhaust pipe 11 are preferably connected to suitable manifolds which communicate with all of the cylinders as shown in Fig. 12. In order to enable the pump 9 to deliver an equal weight of air at all times to the cylinder 1 regardless of atmospheric pressure, means is provided to automatically control the position of the exhaust throttle valve 12 by means of an actuating device which is sensitive to changes in atmospheric pressure. As shown in Figs. 1, 2, 3, and 5, the actuator for the throttle valve 12 is in the form of a bellows 13 which is sealed and contains air at a suitable pressure so that it is contracted or expanded by an increase or decrease in atmospheric pressure acting upon the exterior thereof, one end of the bellows being attached to a stationary support and the opposite end of the bellows being movable. The pressure of the atmosphere tending to collapse the bellows may be resisted by suitable means such as a spring 14 shown attached at one end to the movable end of the bellows and at its opposite end to a stationary member such as the pipe 11. When there is a decrease in atmospheric pressure such as occurs with an increase in altitude, the movable end of the bellows 13 is moved outwardly by the spring 14 and actuates the valve 12 through a connecting rod 15 toward closed position to throttle the exhaust. Throughout a considerable range of altitudes, air may be supplied to the engine at a substantially constant pressure by the pump 9 through the pipe 8 regardless of the altitude at which the engine may be operating. At sea level the pressure of the air supplied through the pipe 8 may be only slightly above atmospheric pressure. At sea level the bellows 13 is compressed by atmospheric pressure and is collapsed sufficiently in opposition to the spring 14 to maintain the valve 12 in substantially open position. As the altitude of the aircraft increases, the bellows 13 is expanded due to the pull of the spring 14 against the lesser atmospheric pressure and partly closes the throttle valve 12, the valve 12 approaching closed position as the altitude increases. Bellows 13 and the spring 14 should be so adjusted as to maintain a substantially constant pressure in the cylinder during the charging operation regardless of atmospheric pressure. If the valve 12 were to remain entirely open, pressure of the air within the cylinder at the beginning of the inward stroke of the piston would not be substantially higher than the pressure of the surrounding atmosphere at the altitude at which the engine is operating, and at the higher altitudes there would be a substantial decrease in the power of the engine. By controlling the exhaust throttle valve in such manner as to restrict the exhaust outlet as atmospheric pressure decreases, the cylinder may be charged with air at a pressure higher than that of the surrounding atmosphere and, throughout a considerable range of altitudes, at substantially the same pressure as that at which the cylinder is charged at sea level, so that the power of the engine is maintained.

Figure 5:
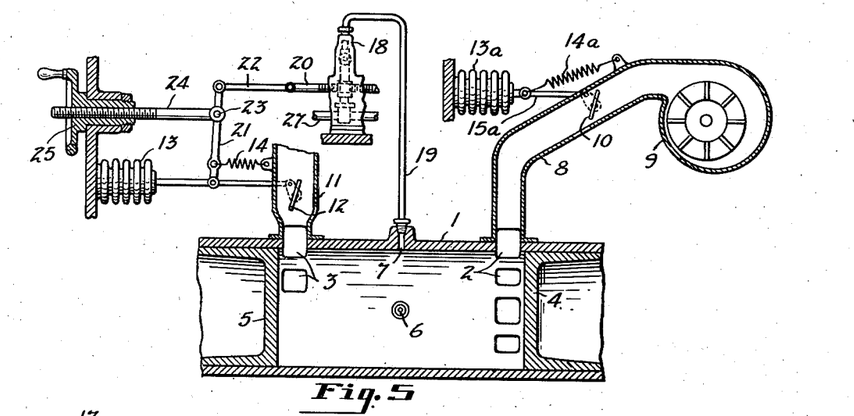
Fig. 5 is a diagrammatic sectional view showing a further modification in which the exhaust throttling valve and the fuel injection pump are controlled by one pressure-sensitive means while the air inlet controlling valve is controlled by a separate pressure-sensitive device.
Figure 6:
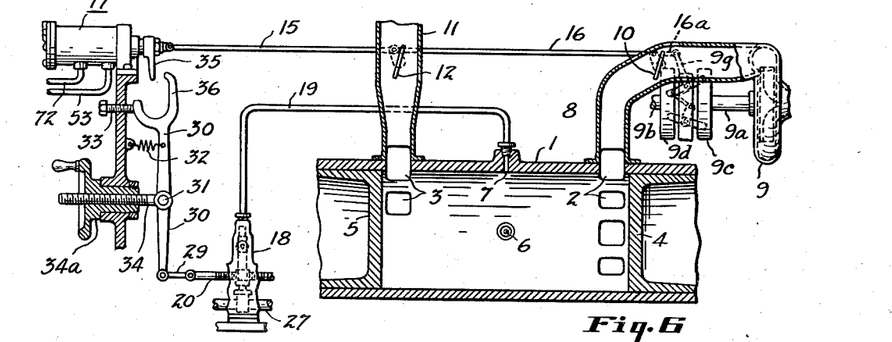
Fig. 6 is a diagrammatic sectional view showing a further modification in which a single pressure controlled operating device simultaneously actuates the air inlet, exhaust control valves and the air pump, and also controls the fuel pump above a predetermined altitude.
Figure 7:
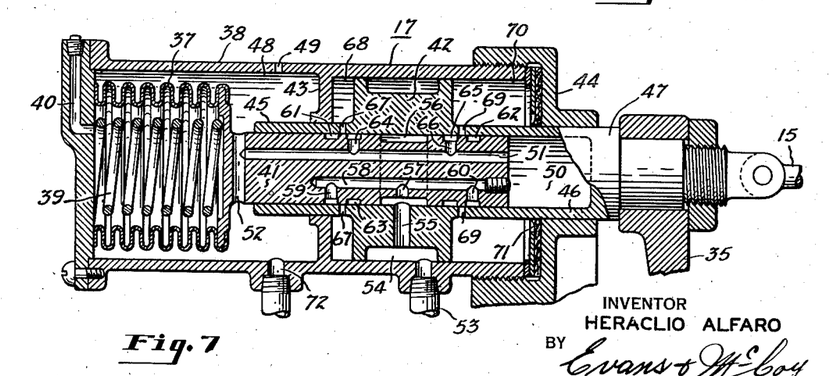
Fig. 7 shows an axial section through the power actuated pressure controlled actuator shown in Fig. 6.
Figure 8:
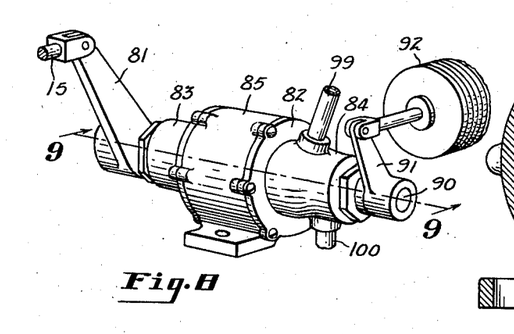
Fig. 8 is a perspective view showing a modified form of pressure-sensitive power actuated control device.
Figure 9:
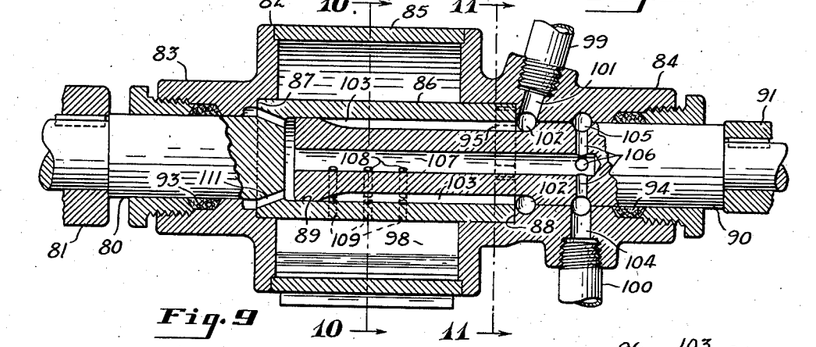
Fig. 9 is an axial section taken on the line indicated at 9—9 of Fig. 8.

Any suitable means may be employed for controlling the position of the throttle valve 12 by the pressure of the surrounding atmosphere. The pressure-sensitive device controlling the valve 12 may be in the form of a bellows 13 such as shown in Figs. 1, 2, 3, and 5 which serves as a direct actuator for the valve, but, if desired, the pressure-sensitive element may serve as a control for a power actuated operating device as shown in Figs. 6 and 7, in which the actuating means, indicated generally by the numeral 17, is a power actuated device controlled by a pressure sensitive element such as a bellows.

Figure 1:
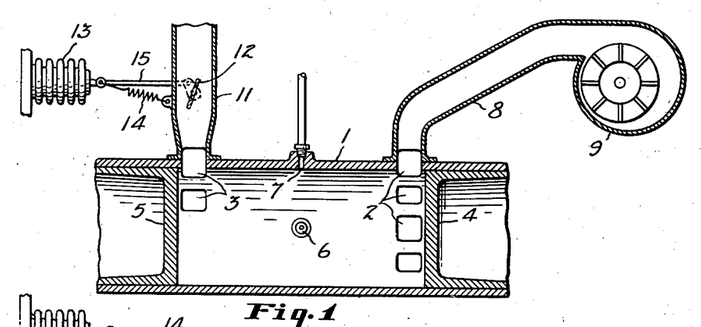
Figure 1 is a diagrammatic sectional view showing the control device of the present invention applied to a cylinder of a two-stroke cycle engine.
Figures 2, 3, 4:
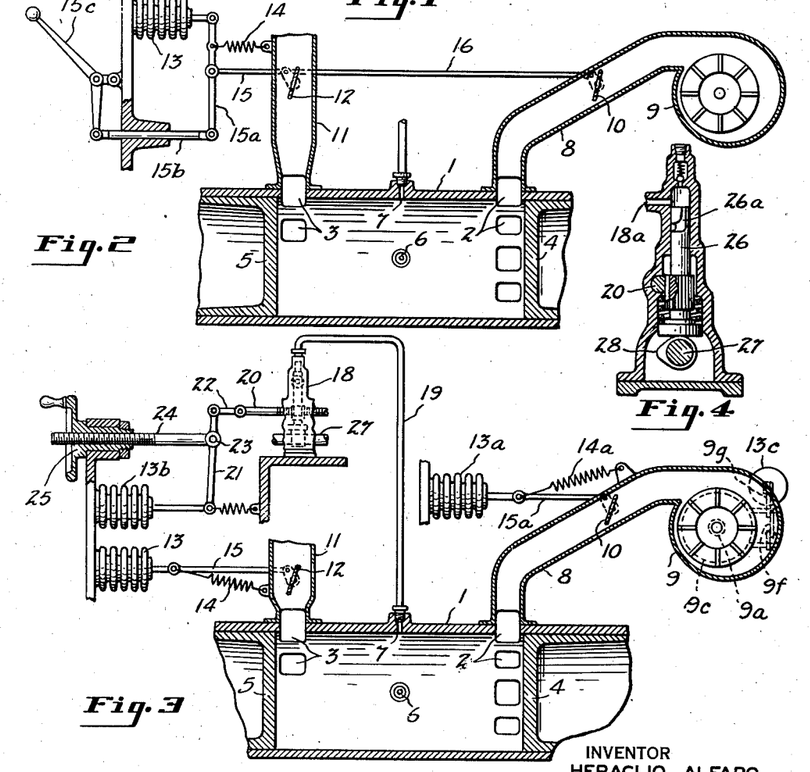
Fig. 2 is a view similar to Fig. 1, showing a modified form of the invention in which valves in the inlet and exhaust conduits are simultaneously controlled by a pressure-sensitive means.
Fig. 3 is a diagrammatic sectional view similar to Fig. 1, showing a further modification in which independent pressure-sensitive control devices are provided for the inlet controlling valve, the exhaust controlling valve, the air pump, and the fuel feeding means.
Fig. 4 is a sectional view of the fuel pump.

The pressure-sensitive means may advantageously control the air inlet valve 10 as well as the exhaust controlling valve 12. In Fig. 2 of the drawings the valve 12 is shown connected to the valve 10 by means of a rod 16 which causes the valve 10 to be moved simultaneously with the valve 12, the position of the valve 10 being opposite that of the valve 12 so that as the exhaust is throttled the inlet is unthrottled, the verb form "unthrottle" being used herein to express the reversal of the throttling action. The valve 10 is preferably maintained partly closed at sea level and at the lower altitudes to avoid excessive pressure in the charge of air delivered to the cylinder, but as the altitude is increased the valve 10 is gradually opened, and the connections may be so arranged that the valve 10 is wholly opened at a predetermined altitude.

As shown in Fig. 2, the valve actuating rod 15 is connected to a lever 15a pivoted at one end to the movable head of the bellows 13 and at its opposite end to a normally fixed rod 15b. The rod 15b may be normally held against movement by friction and may be actuated by means of a lever 15c so that the desired adjustments of the valves may be made manually in the event that the pressure-sensitive device should for any reason become ineffective.

It is apparent that equivalent results can be obtained by operating the valve 10 by means of a separate bellows 13a as shown in Fig. 3, the valve 10 being connected directly to a rod 15a and the bellows being provided with a spring 14a, the connection being such that as the bellows is moved outwardly by the spring 14a, the valve 10 is moved toward open position.

In some instances it may be desirable to regulate the fuel feed in addition to the air inlet and exhaust. As shown in Figs. 3, 4, 5, and 6 of the drawings, a suitable fuel pump 18 is connected by a pipe 19 with the injector nozzle 7 for delivering charges of fuel to the cylinder 1. The pump 18 may be provided with a suitable movable regulator 20 which controls the volume of the charges of fuel delivered through the pipe 19. The regulator 20 may be of any suitable type and may be actuated by a suitable lever 21, one end of which is connected by a link 22 to the regulator 20, the opposite end of the lever 21 being pivoted either to the movable part of the bellows 13, as shown in Fig. 5, or the movable part of a separate bellows 13b, as shown in Fig. 3. The lever 21 is pivoted intermediate its ends at 23 to a supporting member 24 which is normally stationary so that the lever 21 is rocked about its pivot 23 when the bellows 13 or 13b is expanded or contracted. A movement of the bellows imparts a proportional movement to the regulator 20 and increases or decreases the rate of fuel input. The supporting member 24 is preferably adjustable manually so that the lever 21 may be rocked independently of the bellows to which it is attached to manually regulate the rate of fuel feed. For manual adjustment the member 24 may be carried by a nut 25 rotatably mounted in a fixed support, so that by turning the nut 25 the pivot 23 of the lever 21 may be shifted to rock the lever 21 about its connection to the bellows 13 and thereby actuate the regulator 20. Also, by adjusting the pivot 23, the fuel charge may be made leaner or richer throughout the range of the automatic control.

The fuel pump 18 is a piston pump such as commonly used for injecting measured quantities of fuel into engine cylinders, in which the amount of fuel delivered upon each stroke of the piston is controlled by a bypass controlled by the regulator 20. As shown in Fig. 4, the pump may have a lateral fuel inlet 18a and a piston 26 which closes the inlet during the pressure stroke. The bypass, which is not fully shown herein, may include a helical groove 26a on the piston 26 and the volume of fuel discharged may be controlled by turning the piston 26 about its axis. The regulator 20 may be in the form of a rack meshing with an elongated gear formed on the piston 26 so that an axial movement of the regulator will impart a turning movement to the piston adjusting the helical bypass groove 26a to permit more or less of the trapped fluid to escape through the bypass. The piston is operated by a timer shaft 27 driven by the engine which has a cam 28 which actuates the piston to deliver charges of fuel through the pipe 19 to the engine cylinder at intervals properly timed with respect to the movements of the engine pistons. Inasmuch as the fuel pump per se is old and well known, only enough of the pump is shown to make clear the operation of the control device of the present invention.

In order to maintain the power of the engine throughout a greater range of altitudes it is desirable to provide means for automatically increasing the speed of the air pump as the altitude of flight is increased.

As shown in Figs. 3 and 13, the speed of the air pump 9 may be regulated by a bellows 13c. Any suitable change speed device may be employed by which the speed of rotation of the pump 9 may be increased automatically upon a reduction in atmospheric pressure due to an increase in the altitude of the aircraft on which the engine is mounted. In Fig. 13 there is shown a change speed device of a well known type in which the pump shaft 9a and a driven shaft 9b have disks 9c and 9d provided with opposed concave toroidal surfaces engaged by friction rollers 9e which are freely rotatable and mounted upon fixed trunnions, the roller supports are connected by a link 9f to cause the supports to turn in opposite directions, and one of the supports has an arm 9g connected to the movable head of the bellows 13c. The peripheries of the rollers 9e are spherical and conform to the driving surfaces on the disks 9c and 9d. Upon expansion of the bellows the rollers move out on the disk 9d and inwardly on the disk 9c, thereby increasing the speed of rotation of the pump 9.

The inlet and exhaust controlling valves and the fuel regulator may be controlled by a single pressure-sensitive device or by individual pressure-sensitive devices, or any two of the controlling elements may be connected to a single pressure-sensitive device. In some instances it may be advantageous to provide separate pressure-sensitive control devices in order to eliminate connecting linkages or in order to provide control elements of differing pressure-sensitive characteristics. In Fig. 2 of the drawings the inlet and exhaust controlling valves are shown connected to a single pressure-sensitive actuator. In Fig. 3 of the drawings the inlet controlling valve, the exhaust controlling valve, the air pump speed control, and the fuel regulator are shown connected to separate pressure-sensitive actuators. In Fig. 5 of the drawings the exhaust throttling valve and the fuel feed regulator are shown connected to one pressure-sensitive actuator, and the inlet controlling valve is shown connected to a separate pressure-sensitive actuator. In Fig. 6 of the drawings the inlet and exhaust controlling valve, the air pump speed control, and the fuel feed regulator are shown operatively connected to a single pressure-sensitive actuator.

In supercharged engines where the inlet is throttled at sea level, I prefer to so control the delivery pump 18 that it will deliver fuel at a constant rate up to a certain altitude and at a varying rate above the predetermined altitude. Such an arrangement is desirable because a constant pressure of air may be maintained up to a certain predetermined altitude and above that altitude there is a reduction in the amount of air delivered to the cylinder, and it is, therefore, desirable to effect a proportional reduction in the fuel charge. Controlling means for effecting regulation of the fuel feed only above a predetermined altitude is shown in Fig. 6 of the drawings, in which the inlet controlling valve 10 and the exhaust controlling valve 12 are simultaneously operated through connecting rods 15 and 16 by a single pressure-controlled power actuated operating device 17. The fuel regulator 20 is in this instance connected by a link 29 to a lever 30 which swings about a pivot 31. A spring 32 normally holds the lever in engagement with an adjustable stop member 33 which may be in the form of a screw, the tension of the spring 32 tending to rock the lever 30 in a direction to engage the lever with the stop screw 33 and to hold the lever in the position determined by the adjustment of the screw 33. Means is preferably provided for actuating the lever 30 manually to shift the regulator 20 so that the rate of fuel feed may be regulated independently of the automatic control. To provide for manual control of the fuel regulator the pivot 31 may be carried by a screw 34 which may be adjusted manually by means of a nut 34a to adjust the lever 30.

The blower speed control device may also be actuated by the operating device 17 by connecting the arm 9g of the speed control device to the actuating rod 16 by means of a link 16a.

The operating device 17 has a movable head 35 which is engageable with a projection 36 carried by the lever 30 at the end thereof opposite that connected to the regulator 20. The lever 30 normally engages the stop screw 33 and the projection 36 is offset with respect to the head 35 when the head 35 is in its retracted position, so that the head 35 has a predetermined amount of outward movement before it engages with the projection 36. During the movement of the head 35 prior to engagement with the projection 36 of the lever 30, the inlet and exhaust valves 10 and 12 are actuated while the fuel regulator remains in a fixed position. By adjusting the screw 33 the extent of free movement of the head 35 may be regulated so that a predetermined reduction in atmospheric pressure corresponding to the pressure at a predetermined altitude will be required to move the head 35 into engagement with the projection 36 of the lever. The head 35 of the operating member 17 moves outwardly as the altitude of the aircraft increases and atmospheric pressure decreases, gradually opening the inlet valve 10 and simultaneously moving the valve 12 toward closed position to throttle the exhaust. After the predetermined altitude is reached, the head 35 will engage with the projection 36 of the lever 30, causing the fuel feed regulator 20 to be actuated to gradually reduce the rate of fuel input, on further decrease in atmospheric pressure as the aircraft moves to higher altitudes.

The pressure-sensitive power actuated operating member 17 is illustrated in detail in Fig. 7 of the drawings. A power actuated operating member may be desirable in connection with large engines or where a single actuator is provided for several valves and fuel feed regulators. For example, it may be desirable in multi-engine air craft to connect the control elements of all the engines to a single pressure-sensitive actuator. In this device the pressure-sensitive element is in the form of a bellows 37 mounted within and at one end of a casing 38 which may be of cylindrical form. The bellows 37 is subjected to atmospheric pressure and a spring 39 may be provided within the bellows to act in opposition to atmospheric pressure. A passage 40 may be provided in the end of the casing 38, to which the bellows is attached, through which air may be exhausted from the interior of the bellows. After exhausting the bellows the passage 40 may be plugged so that the bellows will be sensitive to variations in pressure of the atmosphere. The movable end of the bellows 37 is attached to a plunger 41. The plunger 41 has a sliding fit in an axial bore in a piston 42 which is mounted for sliding movement within the outer portion of the casing 38. Intermediate its ends the casing 38 is provided with a partition 43 and its outer end is closed by a head 44. The piston 42 has an inwardly projecting sleeve 45 which fits slidably within a central aperture in the partition 43 and has an outwardly projecting sleeve 46 which is slidable in a central aperture in the head 44. The sleeve 46 has a closed end 47 which carries the actuating head 35 and which is connected to the valve actuating rod 15. The partition 43 provides a bellows chamber 48 at the inner end of the casing 38 and atmospheric pressure is maintained within the bellows chamber by means of one or more openings 49 to the atmosphere. To permit relative movement between the plunger 41 and piston 42 the outer end of the plunger 41 is spaced from the closed end 47 of the piston forming a chamber 50 within the outer end of the piston. It is desirable that the piston be freely movable with respect to the plunger 41, and means is, therefore, provided for equalizing the pressure in the chambers 48 and 50. An axial passage 51, extending from the outer end of the plunger 41 to a diametrical passage 52 within the chamber 48, maintains constant communication between the chambers 48 and 50 and serves to equalize the pressure in said chambers 48 and 50. The piston 42 is power actuated and its movement is controlled by the bellows 37, as will be presently explained. Motive power for actuating the piston 42 may be supplied by oil under pressure delivered from the engine lubricating system. This oil may be delivered to the piston chamber of the casing 38 through a pipe 53 which communicates with a wide groove 54 in the periphery of the piston 42. The groove 54 communicates through a radial passage 55 in the piston with a circumferential groove 56 formed on the plunger 41. The circumferential groove 56 communicates through a radial passage 57 with an axial passage 58 formed in the plunger 41. The axial passage 58 communicates at its opposite ends with radial passages 59 and 60 which lead to circumferential grooves 61 and 62 formed on the plunger 41, the groove 61 being within the sleeve portion 45 of the plunger and the groove 62 being within the sleeve portion 46 of the plunger. The plunger 41 is provided a short distance outwardly of the circumferential groove 61 with a circumferential groove 63 which communicates through a radial passage 64 with the axial passage 51 of the plunger. A short distance inwardly of the groove 62 the plunger is provided with a circumferential groove 65 which communicates through a radial passage 66 with the axial passage 51. The sleeve 45 is provided with apertures 67 which are normally positioned between the grooves 61 and 63, and these apertures are adapted to establish communication between either the groove 61 or the groove 63 and the inner pressure chamber 68 between the partition 43 and the piston 42 upon an outward or inward movement of the plunger 41 with respect to the piston 42. Apertures 69 are provided in the sleeve 46. These apertures are normally positioned between the grooves 62 and 65 so as to establish communication between the outer pressure chamber 70 between the piston 42 and the head 44 and the groove 62 or the groove 65 upon an inward or outward movement of the plunger 41 with respect to the piston. A suitable packing ring 71 may be provided to seal the opening of the head 44 and a drain outlet 72 is provided at the bottom of the chamber 48 to carry away oil exhausted from the pressure chambers 68 and 70.

In the operation of the device, oil under pressure is maintained in the piston groove 54, the plunger groove 56, and the axial passage 58 of the plunger. The openings 67 and 69 leading to the pressure chambers 68 and 70 are normally covered by the cylindrical portions of the plunger 41 between the grooves 61 and 63 and 62 and 65. Upon a drop in atmospheric pressure, the plunger 41 is moved outwardly by the spring 39, causing the groove 61 to register with the openings 67 and the groove 65 to register with the openings 69. Oil under pressure is admitted to the chamber 68 from the groove 61 through the openings 67, creating pressure in the chamber 68, tending to move the piston 42 outwardly. At the same time, oil is permitted to escape from the chamber 70 through the apertures 69 into the groove 65 through the radial passage 66 into the axial passage 51 of the plunger 41 into the chamber 48, and to the drain outlet 72. Pressure of the oil in chamber 68 moves the piston 42 outwardly, and this movement continues until the apertures 67 and 68 are moved out of register with the grooves 61 and 65. Thus, upon an outward movement of the plunger 41 due to a decrease in atmospheric pressure, a corresponding movement is imparted by the oil under pressure to the piston 42 which actuates the valves and fuel regulator.

Upon an inward movement of the plunger 41 due to an increase in atmospheric pressure, such as that due to movement from a high altitude to a lower altitude, fluid under pressure is admitted to the chamber 70 from the groove 62 and oil is drained from the chamber 68 through the apertures 67, groove 63, and passage 51, causing an inward movement of the plunger 41. By providing a power actuated member and controlling the movement of the power actuated member by means of a pressure-sensitive element, any desired amount of force may be exerted upon the valves and fuel regulating devices to actuate the same.

In Figs. 8 to 11 of the drawings there is shown a modified form of air pressure controlled power actuator in which the operating element has a turning movement instead of an axial movement. In this modification the movable operating member is a shaft 80 which has an arm 81 connected to the valve actuating rod 15. The shaft 80 is mounted in a casing 82 which has end bearing portions 83 and 84 and an enlarged cylindrical chamber portion 85. The shaft 80 has an enlarged portion 86 within the enlarged portion 85 of the casing, the opposite ends of which are journaled in the end bearing portions 83 and 84 of the casing, the shaft 80 being held against axial movements in the casing by bearing shoulders 87 and 88. The enlarged portion 86 of the shaft 80 has an axial bore 89 which provides a bearing for the inner end of a control shaft 90 which extends through the bearing portion 84 of the casing and has an arm 91 attached to its outer end which is connected to the movable head of a pressure-sensitive device such as a bellows 92.

The shaft 80 is actuated by fluid pressure within the casing 82 and to prevent leakage of fluid from the casing, packing glands 93 and 94 are provided around the shafts 80 and 90 in the bearing portions 83 and 84 of the casing 82. The shaft 90 is held against endwise movement and is permitted a limited turning movement with respect to the shaft 80 by means of radial splines 95 which extend into arcuate slots in the end of the shaft 80 which engages the shoulder 88 of the casing. The splines 95 project outwardly into arcuate slots 96 in the end of the enlarged portion 86 of the shaft 80 and bear against the shoulder 88. The slots 96 are wider than the splines 95 and permit the shaft 90 to have a limited turning movement with respect to the shaft 80.

The enlarged portion 85 of the casing has inwardly extending partition walls 97 on opposite sides of the shaft 80 which bear at their edges on the enlarged portion 86 of the shaft 80 and divide the cylindrical portion 85 of the casing into two separate chambers. The enlarged portion 86 of the shaft 80 carries two diametrically opposite vanes 98 which bear against the interior of the cylindrical wall of the casing, one of the vanes 98 being positioned in each of the casing chambers.

The partition walls 97 and vanes 98 provide four pressure chambers within the casing so that by admitting fluid under pressure to one side of each vane and exhausting the fluid from the opposite side of the vane, turning movements may be imparted to the shaft 80. Fluid under pressure, such as oil from the engine lubricating system, may be conducted to the casing 82 by means of a pipe 99 connected to the bearing portion 84 and exhausted from the casing through a drain pipe 100. The pressure line 99 connects with a passage 101 in the bearing portion 84 of the casing which leads to a circumferential groove 102 around the shaft 90. The groove 102 opens to four longitudinal grooves 103 in the shaft 90, the grooves 103 being arranged in two pairs which are on diametrically opposite sides of the shaft. The exhaust pipe 100 connects with a passage 104 in the bearing portion 84 of the casing which leads to a circumferential groove 105 around the shaft 90 which is connected by radial passages 106 with an axial passage 107 leading to the inner end of the shaft 90. Radial passages 108 extend from the passage 107 to the periphery of the shaft 90 between the longitudinal grooves 103 of each pair. The enlarged portion 86 of the shaft 80 has passages 109 and 110 on opposite sides of and adjacent to each of the vanes 98 through which communication may be established between the pressure chambers of the casing and the passages within the bore 89.

Figure 10:
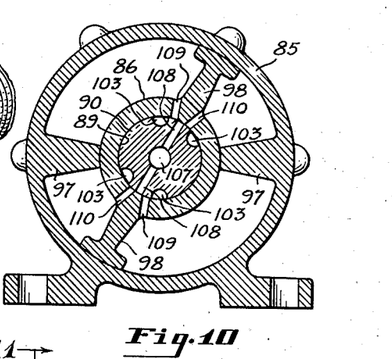
Fig. 10 is a transverse section taken on the line indicated at 10—10 in Fig. 9.
Figure 11:
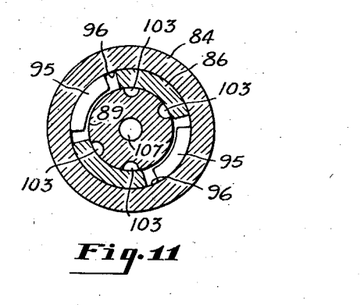
Fig. 11 is a transverse section taken on the line indicated at 11—11 in Fig. 9.

The shaft 90 is normally so positioned that the outer ends of the passages 108 are closed by the portion of the wall of the bore 89 lying between the passages 109 and 110 and the passages 109 and 110 are closed by the cylindrical portion of the surface of the shaft 90 lying between the grooves 103 and the passages 108, as shown in Fig. 10. If the shaft 90 be turned in a clockwise direction from that shown in Fig. 10, the passages 109 will be registered with grooves 103 and the passages 110 will be registered with the passages 108 so that pressure is admitted to the chambers on one side of the vanes 98 and exhausted from the chambers at the opposite sides of the vanes, applying pressure to the vanes in a direction to turn the shaft 80 in a clockwise direction. A turning movement of the shaft 90 in a counterclockwise direction will connect the passages 110 with the grooves 103 and the passages 109 with the passages 108 to impart a counterclockwise movement to the shaft 80. In operation small angular movements are imparted to the shaft 90 by the bellows 92 and similar movements are imparted by fluid pressure to the shaft 80, the movement of the shaft 80 in each case being just sufficient to move the passages 109 and 110 to non-registering position, so that the angular movements imparted to the shaft 80 by the fluid under pressure are always approximately equal to the angular movements imparted to the shaft 90. The arm 81, being connected to an engine controlling element, will impart a movement to that element proportional to the movement of the pressure-sensitive device actuating the shaft 90. If the oil pressure should fail, the bellows 92 would impart the necessary motion to the shaft 80 through the splines 95.

In either of the power actuated control devices herein shown the movement of the power actuated member is equal to the movement of a control element to which movement may be imparted by any desired means. For example, the position of the controlling arm 91 could readily be adjusted manually if the bellows 92 should get out of order.

In Fig. 12 of the drawings the invention is shown applied to a barrel engine having cylinders 1 grouped about the shaft and a propeller 112 carried by an aeroplane 113. The inlet pipe 8 and exhaust pipe 11 are connected to suitable manifolds 114 and 115 which communicate with the engine cylinders. The inlet and exhaust valves 10 and 12 may be controlled by suitable actuating devices such as 13 and 13a which are sensitive to variations in atmospheric pressure, so that the controlling valves are automatically adjusted as the altitude of the aeroplane is increased or decreased.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a two-stroke cycle engine for aircraft, a cylinder provided with inlet and exhaust passages, a valve for throttling the exhaust, a valve for throttling the inlet, and means automatically responsive to variations in altitude for simultaneously adjusting said valves, one toward open and the other toward closed position.

2. In a two-stroke cycle engine for aircraft, a cylinder having inlet and exhaust passages, a valve for throttling the exhaust, a valve for throttling the inlet, fuel feeding means, and means responsive to variations in atmospheric pressure for moving said exhaust throttling valve toward closed position and said inlet throttling valve toward open position upon a decrease in atmospheric pressure and for simultaneously controlling said fuel feeding means to increase the fuel input.

3. In a two-stroke cycle engine for aircraft, a cylinder having inlet and exhaust passages, means for delivering air under pressure to the cylinder inlet, a valve for throttling the exhaust, a valve for throttling the inlet, and means automatically controlled by variations in atmospheric pressure for moving said exhaust throttling valve toward closed position and said inlet throttling valve toward open position upon a decrease in atmospheric pressure.

4. In a two-stroke cycle engine for aircraft, a cylinder having inlet and exhaust passages, means for delivering air under pressure to the cylinder inlet, a valve for throttling the exhaust, a valve for throttling the inlet, fuel feeding means including a fuel pump, and means responsive to variations in atmospheric pressure for actuating said valves, one toward open position and the other toward closed position and for simultaneously controlling said pump to vary the rate of fuel delivery.

5. In a two-stroke cycle engine for aircraft, a cylinder having inlet and exhaust passages, means for delivering air under pressure to the cylinder inlet, a valve for throttling the exhaust, a valve for throttling the inlet, fuel feeding means including a fuel pump, means responsive to variations in atmospheric pressure for actuating said valves and for simultaneously controlling said pump to vary the rate of fuel delivery, and independent means for controlling the delivery of said pump.

6. In a two-stroke cycle engine for aircraft, a cylinder provided with inlet and exhaust passages, means for delivering air under pressure to the inlet, a bellows adapted to expand and contract as the atmospheric pressure decreases or increases, and means operated by the bellows for simultaneously throttling the exhaust and controlling said air delivering means to increase the rate of flow of air to the cylinder upon expansion of the bellows.

7. In a two-stroke cycle engine for aircraft, a cylinder provided with inlet and exhaust passages, means for delivering air under pressure to the inlet, a bellows adapted to expand and contract as the atmospheric pressure decreases or increases, means operated by the bellows for simultaneously throttling the exhaust and controlling said air delivering means to increase the rate of flow of air to the cylinder upon expansion of the bellows, means for feeding fuel to the cylinder, and means controlled by said bellows for regulating the rate of fuel feed.

8. In a two-stroke cycle engine for aircraft, a cylinder provided with inlet and exhaust passages, means for delivering air under pressure to the inlet, a bellows adapted to expand and contract as the atmospheric pressure decreases or increases, means operated by the bellows for simultaneously throttling the exhaust and controlling said air delivering means to increase the rate of flow of air to the cylinder upon expansion of the bellows, means for feeding fuel to the cylinder, means controlled by said bellows for regulating the rate of fuel feed, and independent means for regulating the fuel feed.

9. In a two-stroke cycle engine for aircraft, a cylinder provided with inlet and exhaust passages, means for delivering air under pressure to the inlet, a bellows adapted to expand and contract as the atmospheric pressure decreases or increases, means operated by the bellows for simultaneously throttling the exhaust and controlling said air delivering means to increase the rate of flow of air to the cylinder upon expansion of the bellows, means including a fuel pump for feeding fuel to said cylinder, and means operated by said bellows for controlling the rate of delivery of fuel from said pump to said cylinder.

10. In a two-stroke cycle engine for aircraft, a cylinder provided with inlet and exhaust passages, means for delivering air under pressure to the inlet, a bellows adapted to expand and contract as the atmospheric pressure decreases or increases, a spring acting upon said bellows and tending to expand the same in opposition to the atmospheric pressure, and means operated by said bellows for simultaneously throttling the exhaust and controlling the air delivering means to increase the rate of delivery of air to the cylinder upon a decrease in atmospheric pressure.

11. In a two-stroke cycle engine for aircraft, a cylinder having inlet and exhaust passages, means for delivering air to the inlet passage, fuel feeding means adapted to normally deliver a predetermined charge of fuel to said cylinder, and means sensitive to variations in atmospheric pressure for throttling the exhaust and controlling the air delivering means to increase the volume of air delivered to the cylinder upon a decrease in atmospheric pressure and for controlling the fuel feeding means to vary the fuel charge when the variation from normal atmospheric pressure exceeds a predetermined amount.

12. In a two-stroke cycle engine for aircraft, a cylinder having inlet and exhaust passages, means adapted to normally deliver a predetermined charge of fuel to said cylinder, an element sensitive to variations in atmospheric pressure, and means controlled by said pressure-sensitive element at atmospheric pressures below a predetermined pressure lower than normal atmospheric pressure for effecting an adjustment of the fuel feeding means to vary the fuel charge, said adjusting means being unaffected by said pressure sensitive element at pressures above said predetermined pressure.

13. In a two-stroke cycle engine for aircraft, a cylinder having inlet and exhaust passages, means adapted to normally deliver a predetermined charge of fuel to said cylinder, an element sensitive to variations in atmospheric pressure, fuel feed regulating means for varying the fuel charge, and actuating means interposed between said pressure-sensitive means and said regulating means, said actuating means being so disposed with respect to said pressure-sensitive means that said actuating means is unaffected by said pressure-sensitive means throughout a predetermined range of atmospheric pressures but is responsive to variations beyond said range.

14. In a two-stroke cycle engine for aircraft, a cylinder having inlet and exhaust passages, means adapted to normally deliver a predetermined charge of fuel to said cylinder, an element sensitive to variations in atmospheric pressure, fuel feed regulating means for varying the fuel charge, actuating means interposed between said pressure-sensitive means and said regulating means, said actuating means being so disposed with respect to said pressure-sensitive means that said actuating means is unaffected by said pressure-sensitive means throughout a predetermined range of atmospheric pressures but is responsive to variations beyond said range, and means for effecting a relative adjustment of said pressure-sensitive means and said actuating means to vary the extent of the range of atmospheric pressures to which said actuating means is unresponsive.

15. In a two-stroke cycle engine for aircraft, a cylinder having inlet and exhaust passages, means adapted to normally deliver a predetermined charge of fuel to said cylinder, an element sensitive to variations in atmospheric pressure, means controlled by said pressure-sensitive element for effecting an adjustment of the fuel feeding means to vary the fuel charge upon a predetermined variation in atmospheric pressure, and independent means for regulating the quantity of fuel delivered to the cylinder.

16. In a two-stroke cycle engine for aircraft, a cylinder having inlet and exhaust passages, means adapted to normally deliver a predetermined charge of fuel to said cylinder, an element sensitive to variations in atmospheric pressure, fuel feed regulating means for varying the fuel charge, actuating means interposed between said pressure-sensitive means and said regulating means, said actuating means being so disposed with respect to said pressure-sensitive means that said actuating means is unaffected by said pressure-sensitive means throughout a predetermined range of atmospheric pressures but is responsive to variations beyond said range, and means controlled by said pressure-sensitive means for simultaneously throttling the exhaust and increasing the volume of air delivered to the cylinder upon a decrease in atmospheric pressure.

17. In a two-stroke cycle engine for aircraft, a cylinder provided with inlet and exhaust passages, a bellows adapted to be expanded and contracted by variations in atmospheric pressure, a movable actuating member controlled by said bellows, means operated by said actuating member for throttling or unthrottling the exhaust and simultaneously unthrottling or throttling the inlet upon a decrease or increase of atmospheric pressure, fuel feeding means, and regulating means for said fuel feeding means, including a pivoted member positioned to be actuated by said movable actuating member after a predetermined movement of said actuating member.

18. In a two-stroke cycle engine for aircraft, a cylinder provided with inlet and exhaust passages, a bellows adapted to be expanded and contracted by variations in atmospheric pressure, a movable actuating member controlled by said bellows, means operated by said actuating member for throttling or unthrottling the exhaust and simultaneously unthrottling or throttling the inlet upon a decrease or increase of atmospheric pressure, fuel feeding means, regulating means for said fuel feeding means, including a pivoted member positioned to be actuated by said movable actuating member after a predetermined movement of said actuating member, and means for adjusting said pivoted member relatively to said actuating member to vary the extent of movement of the actuating member independently of the pivoted member.

19. In a two-stroke cycle engine for aircraft, a cylinder provided with inlet and exhaust passages, a bellows adapted to be expanded and contracted by variations in atmospheric pressure, a movable actuating member controlled by said bellows, means operated by said actuating member for throttling or unthrottling the exhaust and simultaneously unthrottling or throttling the inlet upon a decrease or increase of atmospheric pressure, fuel feeding means, regulating means for said fuel feeding means, including a pivoted member positioned to be actuated by said movable actuating member after a predetermined movement of said actuating member, and independent means to vary the rate of fuel feed.

20. In a two-stroke cycle engine for aircraft, a cylinder provided with inlet and exhaust passages, means for delivering air under pressure to the inlet, a bellows adapted to be expanded or contracted by a decrease or increase in atmospheric pressure, means controlled by said bellows to throttle or unthrottle the exhaust upon a decrease or an increase of atmospheric pressure, a second bellows, and means controlled by said second bellows to unthrottle or throttle the inlet upon a decrease or an increase of atmospheric pressure.

21. In a two-stroke cycle engine for aircraft, a cylinder provided with inlet and exhaust passages, means for delivering air under pressure to the inlet, a bellows adapted to be expanded or contracted by a decrease or increase in atmospheric pressure, means controlled by said bellows to throttle or unthrottle the exhaust upon a decrease or an increase of atmospheric pressure, a second bellows, means controlled by said second bellows to unthrottle or throttle the inlet upon a decrease or an increase of atmospheric pressure, fuel feeding means, and means controlled by the first mentioned bellows to regulate the fuel feeding means.

22. In a two-stroke cycle engine for aircraft, a cylinder provided with inlet and exhaust passages, means for delivering air under pressure to the inlet, a bellows adapted to be expanded or contracted by a decrease or increase in atmospheric pressure, means controlled by said bellows to throttle or unthrottle the exhaust upon a decrease or an increase of atmospheric pressure, a second bellows, means controlled by said second bellows to unthrottle or throttle the inlet upon a decrease or an increase of atmospheric pressure, fuel feeding means, a third bellows, and means controlled by the third bellows for regulating the fuel feeding means.

23. In a two-stroke cycle engine for aircraft, a cylinder provided with inlet and exhaust passages, a power actuated member, means actuated by said member for throttling or unthrottling the exhaust, a bellows having a part movable in response to variations in atmospheric pressure, a spring acting upon the movable part of said bellows in opposition to the atmospheric pressure, and means for controlling the movements of the power actuated member by the movements of the bellows.

24. In a two-stroke cycle engine for aircraft, a cylinder provided with inlet and exhaust passages, a power actuated member, means actuated by said member for throttling or unthrottling the exhaust, means operated by said power actuated member for unthrottling or throttling the inlet simultaneously with the throttling or unthrottling of the exhaust, and means responsive to changes in altitude for controlling the movements of said power actuated member.

25. In a two-stroke cycle engine for aircraft, a cylinder provided with inlet and exhaust passages, a power actuated member, means actuated by said member for throttling or unthrottling the exhaust, means operated by said power actuated member for unthrottling or throttling the inlet simultaneously with the throttling or unthrottling of the exhaust, fuel feeding means, means operated by said power actuated member for regulating the rate of fuel feed, and pressure-sensitive means responsive to changes in atmospheric pressure for controlling the movements of said power actuated member.

26. In a two-stroke cycle engine for aircraft, a pump for supplying air under pressure to the engine cylinders, an exhaust throttling valve, and means automatically responsive to variations in altitude for simultaneously actuating said valve and varying the speed of said air pump.

27. In a two-stroke cycle engine for aircraft, a pump for supplying air under pressure to the engine cylinders, fuel feeding means, pressure sensitive actuating means, and means operated by said pressure sensitive means for simultaneously varying the rate of fuel feed and the speed of said air pump.

28. In a two-stroke cycle direct fuel injection engine for aircraft, a pump for supplying air under pressure to the engine cylinders independently of the fuel, means including a change speed mechanism for driving said pump, a pressure sensitive actuator, and means connecting said actuator to said change speed mechanism to automatically vary the speed of said pump in accordance with variations in atmospheric pressure.

29. In combination with an internal combustion engine for aircraft, means for supplying combustible charges to the engine cylinders comprising fuel feeding means and a pump for supplying air under pressure to the engine cylinders including a speed changing device, fuel feed regulating means, and means responsive to variations in atmospheric pressure for controlling said speed changing device and said fuel feed regulating means.

HERACLIO ALFARO.